Jan. 12, 1965   R. J. DUBUC   3,165,174
BRAKE THRUST LINK
Filed March 30, 1961   2 Sheets-Sheet 1
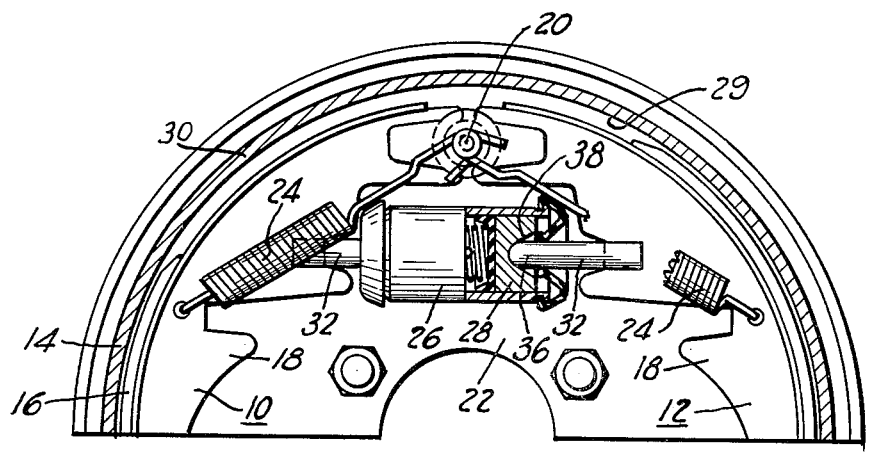
FIG.1
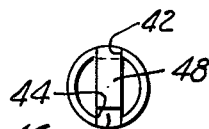
FIG.6
FIG.2
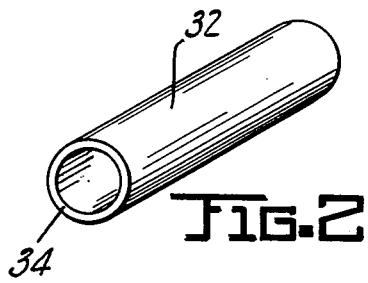
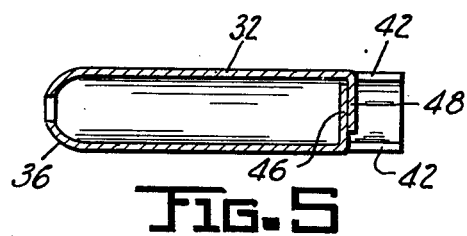
FIG.5
FIG.3
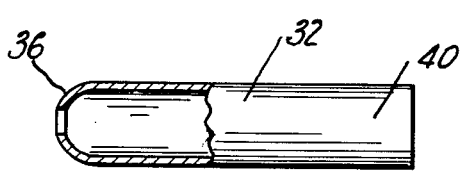
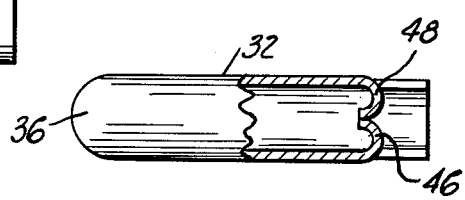
FIG.7
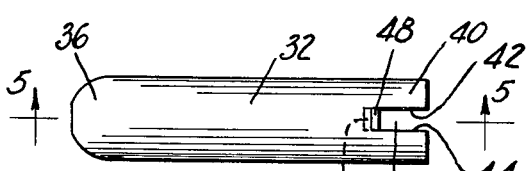
FIG.4
INVENTOR.
ROBERT J. DUBUC
BY
John A. Young
ATTORNEY Jan. 12, 1965   R. J. DUBUC   3,165,174
BRAKE THRUST LINK Filed March 30, 1961   2 Sheets-Sheet 2

INVENTOR.
ROBERT J. DUBUC
BY John A. Young
ATTORNEY

United States Patent Office 3,165,174
Patented Jan. 12, 1965

3,165,174
BRAKE THRUST LINK
Robert J. Dubuc, South Bend, Ind., assignor to The Bendix Corporation, South Bend, Ind., a corporation of Delaware
Filed Mar. 30, 1961, Ser. No. 99,410
2 Claims. (Cl. 188—78)

This invention relates to thrust links and improved processes for producing such links.

In a hydraulically actuated brake, there are generally provided two thrust links between the wheel cylinder pistons and brake shoes to transmit applying effort from the piston to the brake shoe causing it to move radially into engagement with the cylindrical surface of the drum. The link or links are arranged to pivot slightly within a seat of the piston to allow relative movement between the shoes which follow one path of movement and the piston or pistons which are constrained to a translatory type movement. Functional requirements for a thrust link are that the link be capable of sustaining certain longitudinally imposed thrust forces between the piston and shoe and that the link be movable relatively to both the shoe and the piston.

It is an object of the invention to provide a novel thrust link which is capable of performing all of its functional requirements and, by virtue of certain novel construction features, is producible by inexpensive processing means.

A further object of the invention is to provide novel processes for producing a thrust link from starting materials which are inexpensive and readily accessible.

A further object of the invention is to produce a thrust link from stamped sheet metal stock.

A further object of the invention is to provide novel processes by which a thrust link can be formed, these processes being readily adaptable for large scale manufacture of thrust links in large scale production quantities, and by which a thrust link can be made at substantially reduced costs.

Other objects and features of the invention, will be apparent from a consideration of the following description, which proceeds with reference to the accompanying drawings, wherein:

FIGURE 1 is a side elevation view of the upper half of a brake, having thrust links embodying the invention incorporated therein;

FIGURE 2 is an isometric view of tubular stock from which the thrust link is formed;

FIGURE 3 is a side elevation view of a tubular member after it has been partially formed, the left-hand side of the tubular member being broken away;

FIGURE 4 is a side elevation view of the thrust link shown completed;

FIGURE 5 is a section view taken on line 5—5 of FIGURE 4;

FIGURE 6 is an end view of the thrust link viewed from the right-hand end of FIGURE 5;

FIGURE 7 is a second embodiment of the invention showing how the abutment can be formed by somewhat diffferent manner than that shown in FIGURE 5;

Figure 8:
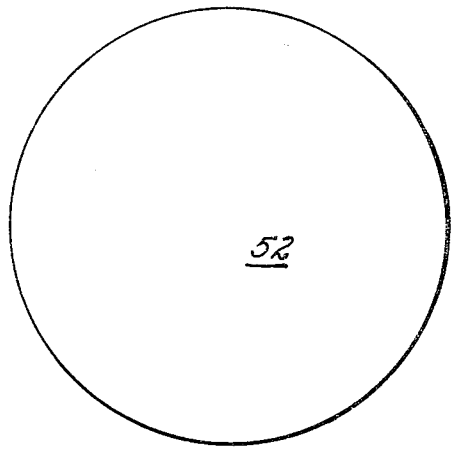
FIGURE 8, 9 and 10 illustrate respectively the blank and successive drawing operations by which the tubular member can be formed.

Referring now to the drawings, the two brake shoes 10 and 12 which are T-shaped in cross section, each includes a rim 14 having friction material lining 16 and a transverse strengthening web 18. The ends of the shoes are normally held against a fixed anchor post 20 perpendicularly mounted in the support plate 22, the shoe ends being held in this normal position by pull back springs 24. The brake is actuated by means of a wheel cylinder 26 having oppositely acting pistons 28. As fluid pressure is communicated to the wheel cylinder between the pistons 28, the pistons are spread and thereby communicate applying thrust from links 30 to the shoes 10, 12 urging them outwardly to engage the lined rims 14 with cylindrical surface 29 of drum 30.

The thrust link shown in FIGURE 1 is constructed from tubular sheet metal stock 32 (FIGURE 2). The end 34 of the stock is shaped to a convexly curved end 36 which seats within a recess 38 of the piston 28 and can move pivotally therein. The opposite end 40 is slit diametrically at 42 and 44, and the integral tab portions 46 and 48 of the tubular member separated by the slits 42 and 44 are then bent inwardly one over the other (FIGURE 5) to provide along the longitudinal axis of the tubular member an abutment which is disposed transversely to the longitudinal axis of the tubular member. When the tab portions 46 and 48 are bent inwardly there is formed a notch 50 which is proportioned to receive the web 18 of the brake shoe therein, the web bottoming on portion 48 so that force can be communicated to the shoe from the end 36 of the link acted on by the piston 28. The slot 50 prevents movement of the link in a plane perpendicular to the plane of the web 18 but permits pivotal movement of the link on its end 36 in a plane which includes the web 18.

Referring to FIGURE 7, the abutment between the link and the shoe can be provided by curling inwardly portions 46 and 48 so that they meet at tangency points of two semicircular portions. Thus, instead of being bent perpendicularly inwardly to lie flatly one against the other, the two sections 46, 48 are curled inwardly one against the other by a striking operation.

Figure 11:
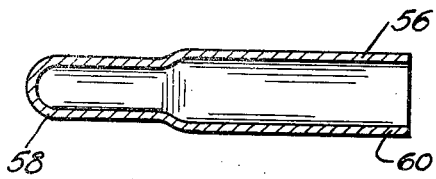
FIGURE 11 illustrates the manner by which a stepped diameter construction can be formed on the tubular member in FIGURE 10.
Figure 12:
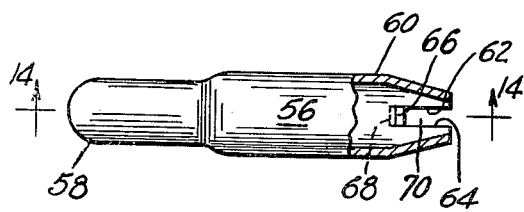
FIGURE 12 illustrates the tubular member of FIGURE 11 following shaping operations on the right-hand end thereof, the right-hand end of the thrust link being broken away to better illustrate this construction.
Figure 9:
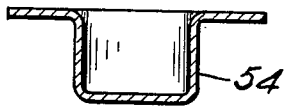
Figure 14:
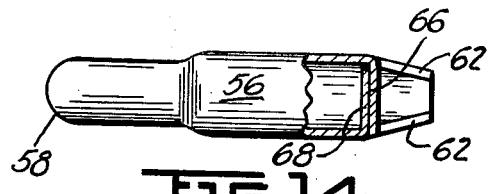
FIGURE 14 is a partial cutaway section view taken on line 14—14 of FIGURE 12.
Figure 10:
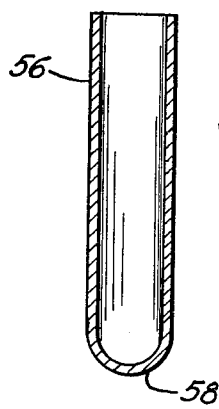
Figure 13:
FIGURE 13 is an end view of FIGURE 12.

Referring next to FIGURES 8, 9 and 10, the tubular section can be formed from a circular sheet metal blank 52 which is first drawn to a cup-shaped configuration 54 (FIGURE 9) and by subsequent successive, deeper drawing operations converted to an elongated tubular shape 56 having a closed convexly curved end 58. The end 58 can then be rolled to a smaller diameter and (FIGURE 11) enabling it to fit more conveniently within the seat of the piston.

The end 60 is then flattened, tapered and then slit at 62 and 64. The portions 66 and 68 are then bent inwardly one over the other to form an abutment with the web 18 of the shoe fitting within the slot 70 formed by bending said sections 66, 68 inwardly.

Figure 15:
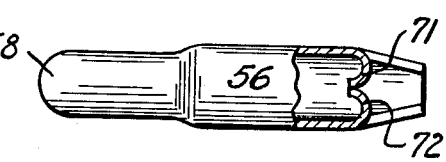
FIGURE 15 is a further embodiment illustrating how the abutment members can be formed inwardly to a different shape from that illustrated in FIGURE 14.

Rather than transversely bending sections 66, 68 inwardly it is possible to curl said sections inwardly, forming semicircular portions 71, 72 as shown in FIGURE 15 with the resulting structure being similar to that of FIGURE 7.

Figure 16:
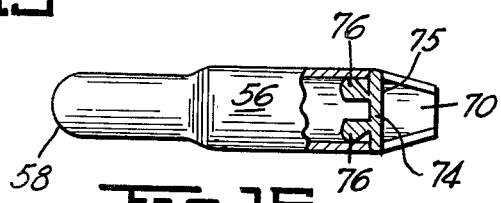
FIGURE 16 is a still further embodiment of the invention illustrating the use of a separate abutment which is disposed transversely in the tubular member instead of providing the abutment from integral sections of the tubular member.

Referring next to the embodiment in FIGURE 16, sections 71 and 72 can be severed from 56 and a separate abutment 74 seated within a slot 70. The abutment 74 is provided with a head 75 having fingers 76 which are force fitted within the larger diameter end of the tubular member 56 by an interference fit to form a gripping connection with 56. The web of the shoe then bears against head 75 which is held within tubular member 56. The link is used as described for the embodiment of FIGURES 2-6 and is interchangeable therewith.

Although the present invention has been described in connection with a few selected example embodiments of the invention, it will be understood that these are illustrations of the invention and are in no sense restrictive thereof. It is reasonably to be presumed that those skilled in the art can make numerous adaptations and revisions of the invention to suit individual design requirements and it is therefore intended that such revisions and variations as incorporate the herein disclosed principles will be included within the scope of the following claims as equivalents of the invention.

What is claimed is:

1. A thrust link for communicating applying force from a wheel cylinder piston to a brake shoe having a web, comprising: a tubular member having at one end a convexly curved bearing surface for bearing engagement between said link and piston, said tubular member being open at the other end thereof, a pair of diametrically spaced slots at the other end of said tubular member for receiving the web of the shoe therein, each said slot opening at one end into the edge of said other end of said tubular member and being closed at the other end thereof, a pair of tabs, each tab being integral with a respective one of said closed ends of said slots and extending therefrom in a direction transverse to and toward the axis of said tubular member, the edges of each tab extending toward said axis being spaced from that portion of the wall of said tubular member from which they are oppositely located, said tabs being arranged in abutting overlapping relationship to provide a reinforced abutment between the shoe web and the link.

2. A thrust link for communicating applying force from a wheel cylinder piston to a brake shoe having a web, comprising: a tubular member having at one end a multi-diametered rounded bearing surface for bearing engagement between said link and piston, said tubular member being open at the other end thereof, a pair of diametrically spaced slots at the other end of said tubular member for receiving the web of the shoe therein, each said slot opening at one end into the edge of said other end of said tubular member and being closed at the other end thereof, a pair of tabs, each tab being integral with a respective one of said closed ends of said slots and extending therefrom in a direction transverse to and toward the axis of said tubular member, the edges of each tab extending toward said axis being spaced from that portion of the wall of said tubular member from which they are oppositely located, said tabs being arranged in abutting overlapping relationship to provide a reinforced abutment between the shoe web and the link.

References Cited in the file of this patent

UNITED STATES PATENTS

| | | |
|---|---|---|
| 1,823,419 | Almen | Sept. 15, 1931 |
| 1,974,252 | Killorin | Sept. 18, 1934 |
| 2,157,994 | Baisch | May 9, 1939 |
| 2,215,243 | Klages | Sept. 17, 1940 |
| 2,263,059 | Werme | Nov. 18, 1941 |
| 2,434,072 | Hoern et al. | Jan. 6, 1948 |
| 2,836,961 | Brand | June 3, 1958 |
| 2,953,674 | Grodt | Sept. 20, 1960 |